Aug. 19, 1969 P. ZUPPIGER 3,462,002
VARYING-PITCH CHAIN-LIKE ARRANGEMENT TO
DRIVE LOADS AT VARIABLE SPEED
Filed July 6, 1967 5 Sheets-Sheet 1
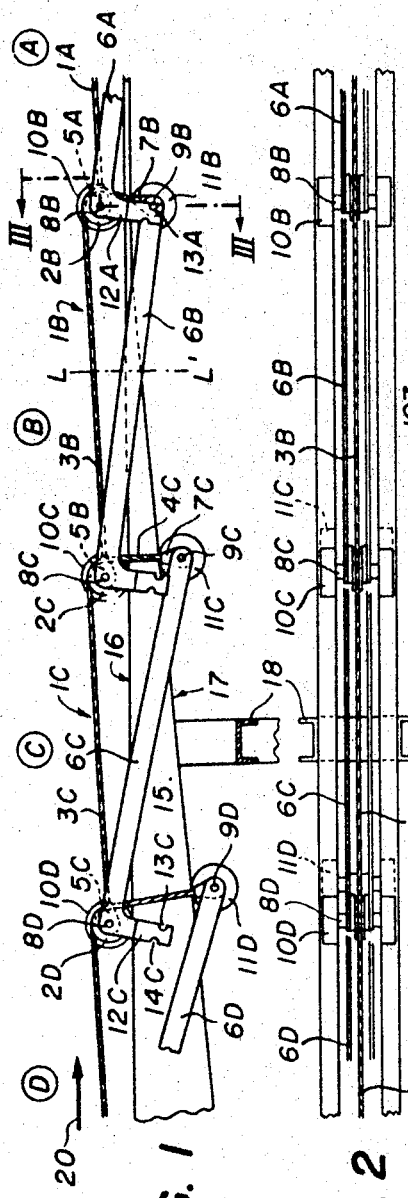
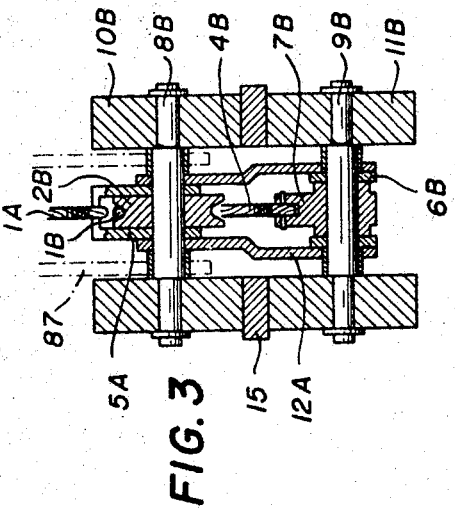
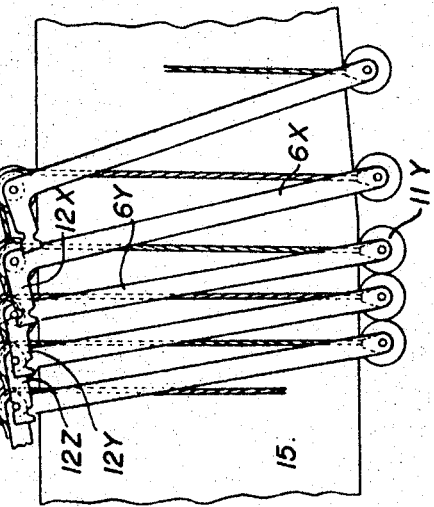

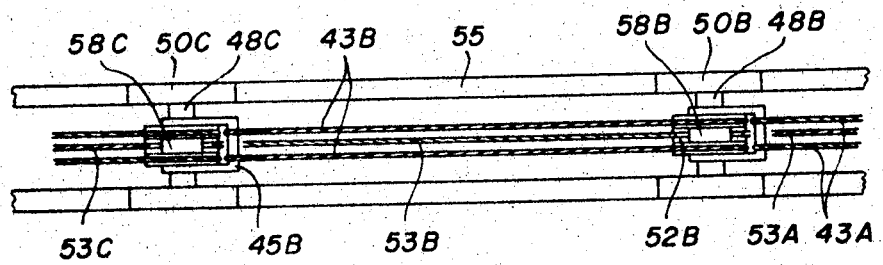
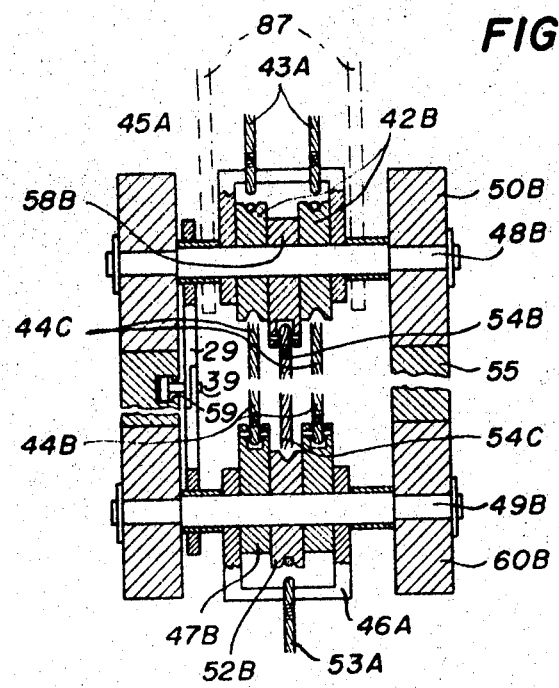
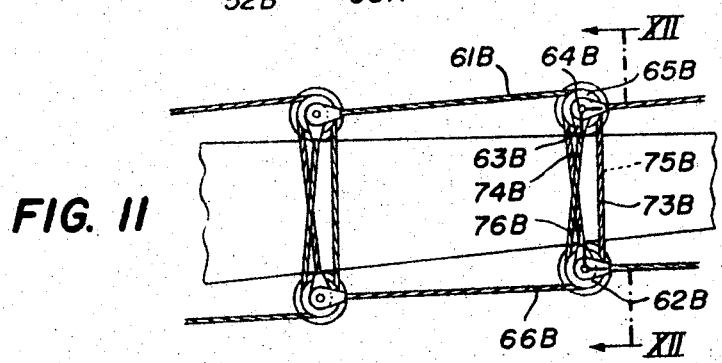

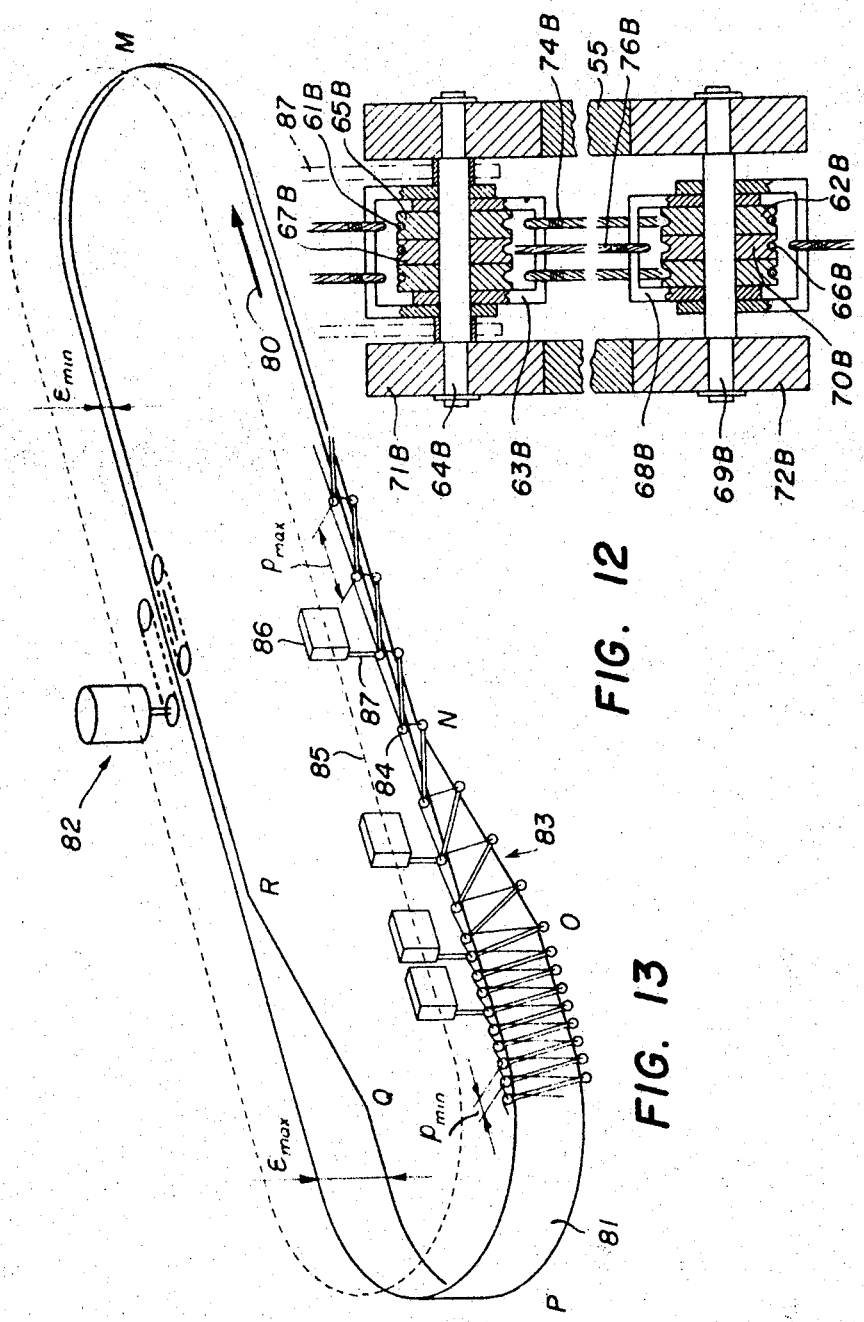

United States Patent Office 3,462,002
Patented Aug. 19, 1969

3,462,002
VARYING-PITCH CHAIN-LIKE ARRANGEMENT TO DRIVE LOADS AT VARIABLE SPEED
Paul Zuppiger, Athenaz, Geneva, Switzerland, assignor to The Battelle Development Corporation, Columbus, Ohio, a corporation of Delaware
Filed July 6, 1967, Ser. No. 651,549
Claims priority, application Switzerland, July 6, 1966, 9,989/66
Int. Cl. B65g 23/00, 21/12
U.S. Cl. 198—110    10 Claims

ABSTRACT OF THE DISCLOSURE

An arrangement for, inter alia, driving loads at varying speed, which comprises guide means providing top and bottom cam surfaces having a varying spacing and a succession of links connected to one aonther to form a chain-like structure. Each link is provided with a longitudinal rope strand whose length is varied under the action of the cam surfaces.

---

The present invention relates to a varying-pitch chain-like arrangement.

By "chain-like arrangement" is meant the association of guide means and of a plurality of elements which are fastened to one another so as to form a kind of "chain" of which these elements constitute the "links." The "pitch" is the distance separating two consecutive links from one another; more concretely, it is the distance separating the two fastening points of a link to the two adjacent links that will be termed the "pitch" of the chain-like arrangement, this distance being measured along the guide means. In known arrangements of this type, the elements are rigid and they are joined to one another by pivots termed primary pivots. Each link is itself made up of a pair of rigid elements which both are of equal length and which are joined to one another by pivots termed secondary pivots. This assembly of links moves along guide means which compel the primary pivots and secondary pivots respectively to follow different paths of varying spacing. Such a hinged system, when moving along the guide means, progressively folds and unfolds; this folding and unfolding action causes the distance between the pins of the primary pivots to vary so that this system constitutes a chain-like structure having a varying "pitch." It is chain-like structures of this kind which are in particular described in British Patent No. 1,020,529.

However, the extent to which such folding can be achieved without causing the mutual reactions that are exerted by the guide means and by the primary and secondary pivots to exceed acceptable limits is restricted so that the "pitch" variation hardly exceeds 2:1.

An object of the present invention is to provide a varying-pitch chain-like arrangement in which the pitch variation by far exceeds the limits to which presently known similar structures are subjected.

According to the present invention there is provided a varying-pitch chain-like arrangement, which comprises guide means including a first surface and a second surface, said first and second surfaces having a spacing which varies along at least a portion of said guide means, and a plurality of successive links, each of said links comprising a first roller carried by a first pin and cooperating with said first surface, a second roller carried by a second pin and cooperating with said second surface, a main pulley mounted on said first pin, a funiform element passing round said main pulley and divided by said main pulley into a longitudinal strand and into a transverse strand, the end of said longitudinal strand being fastened to the first pin of a first adjacent link and said transverse strand being connected to said second pin, and coupling means for coupling said second pin to one of the pins of one of the adjacent links.

Figure 5:
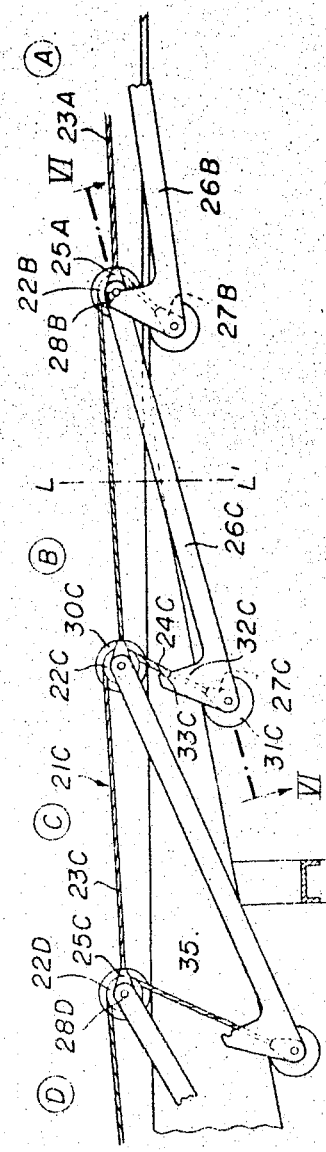
Figure 6:
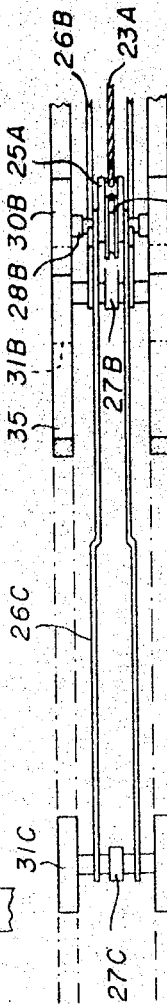
Figure 7:
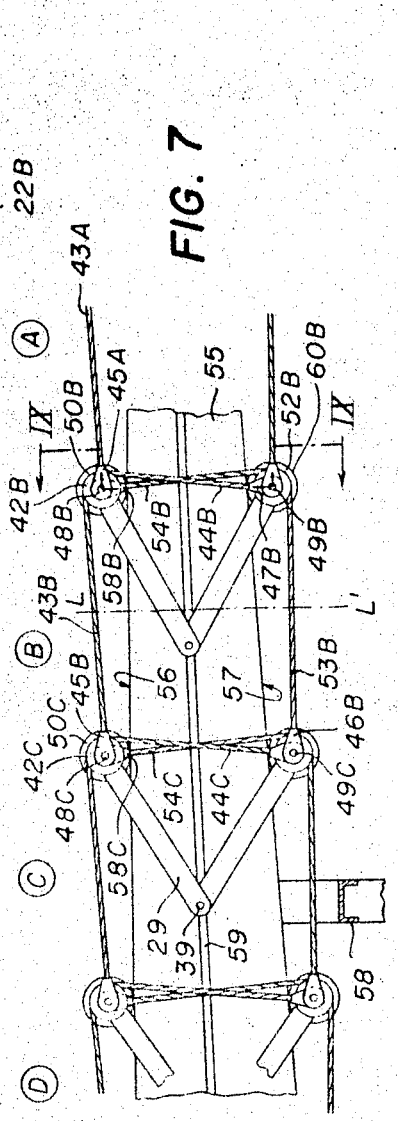
Figure 10:
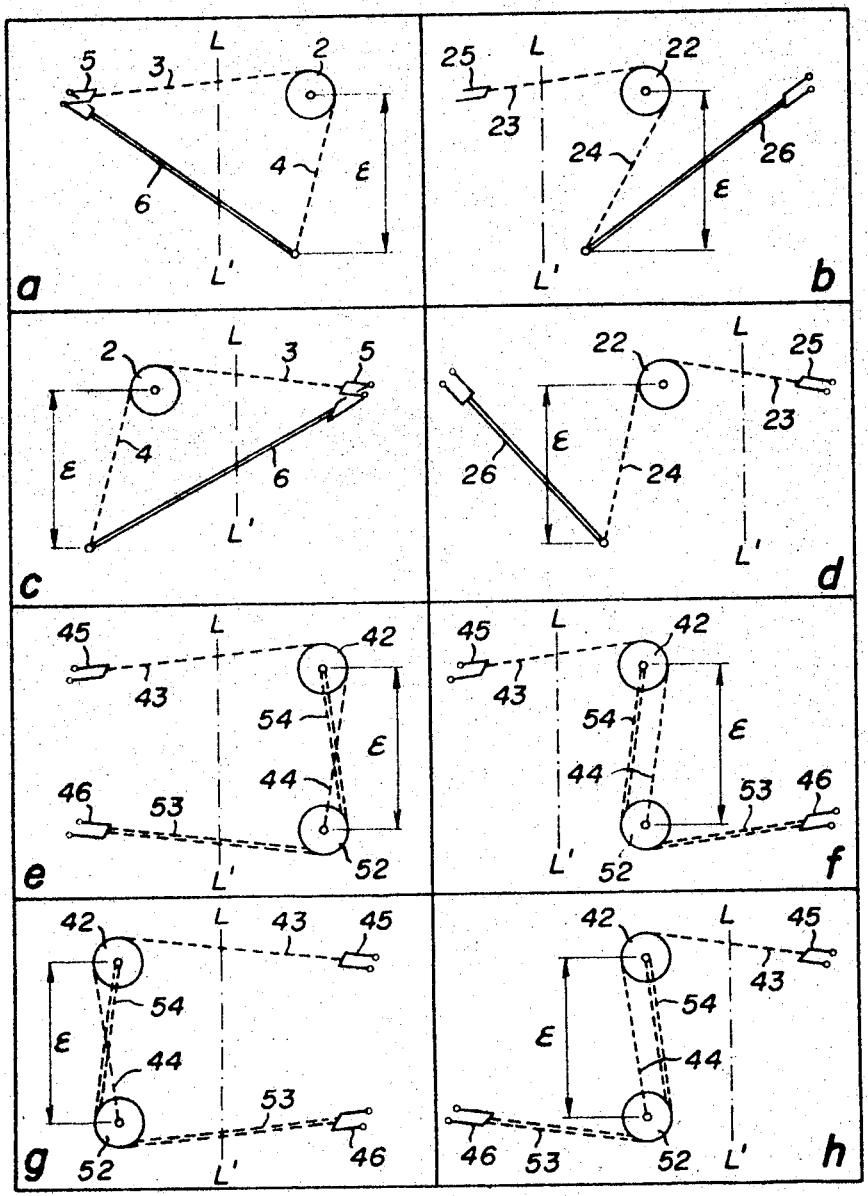

In the accompanying drawings:
FIGURES 1 and 2 are views of a portion of a first embodiment of the arrangement provided by the present invention, FIGURE 1 being a section along line I—I of FIGURE 2 and FIGURE 2 being a plan view;
FIGURE 3 is a cross-section, on an enlarged scale, along line III—III of FIGURE 1;
FIGURE 4 is a section, in a plane similar to that of FIGURE 1, of another portion of this first embodiment;
FIGURES 5 and 6 are views of a portion of a second embodiment of the arrangement provided by the present invention, FIGURE 5 being a section in a plane similar to that of FIGURE 1 and FIGURE 6 being a section on an enlarged scale along line VI—VI of FIGURE 5;
FIGURES 7 and 8 are views of a portion of a third embodiment of the arrangement provided by the present invention, FIGURE 7 being a side view section in a plane similar to that of FIGURE 1 and FIGURE 8 being a plan view on an enlarged scale;
FIGURE 9 is a cross-section, on a still larger scale, along line IX—IX of FIGURE 7;
FIGURE 10 is a recapitulative table which schematically illustrates the three embodiments and their main variants;
FIGURE 11 is a section, in a plane similar to that of FIGURE 1, of a still further variant;
FIGURE 12 is a cross-section, on a larger scale, along line XII—XII of FIGURE 11; and
FIGURE 13 shows a particular application of the arrangement according to its first embodiment.

In FIGURE 1 is to be seen a pair of consecutive links of the first embodiment of the invention and a portion of the links that are contiguous to this pair. All links are identical and only one will be described, it being understood that the reference numerals relating to the same parts of different links will only differ insofar that they are followed by a letter identifying the link. A link, for instance link C, comprises a funiform element 1C, such as for example a length of cable, a main pulley 2C, around which the funiform element 1C forms a bend which divides it into a first portion forming a longitudinal strand 3C and into a second portion forming a transverse strand 4C, a shackle 5C secured to the end of the longitudinal portion and a pair of parallel arms 6C which are secured to the end of the transverse strand by a shackle 7C. The shackle 5C is intended to fasten the end of the longitudinal strand 3C to the main pulley 2D of the link D adjacent link C, and the pair of arms 6C constitute coupling means intended to couple the end of the transverse strand 4C to the same main pulley 2D of the following link D. These connections are made by pins, i.e. a pin 8C which carries the main pulley 2C and which has fitted thereon the shackle 5B of the preceding link C, and a pin 9C which extends through arms 6C and on which is fitted shackle 7C. These pins are each provided with a pair of rollers, a first, upper, pair 10C for pin 8C and a second, lower, pair 11C for pin 9C. These two pairs of rollers cooperate with the two faces of a guide means 15 inserted between them: thus the first pair 10C cooperates with the upper face 16 and the second pair 11C cooperates with the lower face 17. This guide means has a thickness which progressively varies (as shown in FIGURE 1, it is thin in the region of link A and thicker in the region of link D): it constitutes in fact a cam which causes the relative spacing of these pairs of rollers to vary in the course of motion of the link. It is made up of a pair of rails which are placed side by side and which are assembled to one another by means of dropped cross-members such as cross-member 18, which are provided at spaced intervals.

The links, which are fastened together in the manner just described and illustrated in FIGURES 1, 2 and 3 for links A, B, C and D, together form a chain-like structure. The latter is driven by any suitable means, not shown, along the guide means 15, for instance in the direction of arrow 20. In so doing, the spacing between the pairs of rollers 10C and 11C progressively varies in dependence on the thickness of the guide means. The length of the transverse strand of each link varies in proportion to this spacing, and that of the longitudinal strand varies oppositely. Consequently, the pitch of the chain-like structure, which pitch is defined by the distance between the pins 8 of the main pulleys of two consecutive links, varies in the course of progression.

In FIGURE 1, the arms of each link are provided with extensions formed with notches, such as, for instance, in the case of arms 6C of link C, the extensions 12C formed with notches 13C and 14C. These extensions are arranged so that one of the pairs of notches of a link come into engagement, when the spacing of the roller pairs of this link is at minimum, i.e. when the pitch of the chain-like structure is at a maximum, with the pin carrying the second, lower, pair of rollers of the following link: thus, in FIGURE 1, the notches 13A of extensions 12A of arms 6A belonging to link A come into engagement with the pin 9B carrying the second, lower, pair of rollers 11B of the following link B. The notches of the other pair are so positioned on these extensions that, when the spacing between the pairs of rollers is at a maximum, i.e. when the pitch of the chain-like structure is at a minimum, they come into engagement with the pin carrying the first, upper, pair of rollers of the second following link. This is what is shown in FIGURE 4 where it can be seen how, when the thickness of the guide means 15 and hence the spacing between the pairs of upper rollers 10Y and the pairs of lower rollers 11Y reach their maximum value, the notches 14X of extensions 12X of arms 6X belonging to link X come into engagement with pin 8Z carrying the first, upper, pair of rollers 10Z of link Z which is the second following link in relation to link X.

The function of these extensions and of these notches is to relieve the funiform elements along the sections of the guide means in which the pitch is at a minimum or at a maximum: in the first case the pull to which the chain-like structure may be subjected can be taken over, at least partially, by the arms and their extensions (6A, 12A, 6B, FIGURE 1); in the second case the pull is taken over, at least partially, by the extensions alone (12Y, 12Z, FIGURE 4).

The presence of these extensions and of these notches may therefore be of advantage in certain cases.

The second embodiment, illustrated in FIGURES 5 and 6, only differs from the first in that the end of the longitudinal strand of a given link is connected to the pin of the main pulley of the following link and that the upper end of the pair of arms of this same given link is fastened to the pin of the main pulley of the preceding link, whereas in the first embodiment the upper end of a pair of arms is connected to the pin of the main pulley of the following link. Thus in the case of link C, which comprises a funiform element 21C, a main pulley 22C, around which the funiform element forms a bend which divides it into a first portion forming a longitudinal strand 23C and into a second portion forming a transverse strand 24C, a shackle 25C and a pair of arms 26C, the end of the longitudinal strand 23C is fastened by the shackle 25C to the pin 28D of the main pulley 22D of the following link D, whereas the upper ends of arms 26C are traversed by the pin 28B of the main pulley 22B of the preceding link B. Besides this difference, the links behave in this second embodiment in a manner similar to that described in connection with the first embodiment: the guide means 35, consisting of a pair of parallel rails, is of varying thickness and forms a cam which causes the spacing between the first, upper, pairs of rollers 30 and the second, lower, pairs of rollers 31 to vary; this variation in spacing modifies the length of the transverse strand and consequently that of the longitudinal strand. The pitch of the chain-like structure formed by the assembly of links that are connected to one another in the manner shown in FIGURE 5, which pitch is defined by the distance separating the pins of the main pulleys of two consecutive links, thus varies locally during the progression of these links along the guide means.

In this embodiment, the arms are also provided with extensions, such as the extensions 32C in the case of arms 26C, formed with notches, such as notches 33C. The notches in the arms of a link are so positioned as to come into engagement, when the pitch of the chain-like structure is at a maximum, with the pin of the main pulley of this same link, whereas in the first embodiment, the corresponding notches come into engagement with the pin of the second, lower, rollers of the following link. The presence of these extensions serves, as in the first embodiment, to take over at least partially the pull exerted by the links on one another thereby relieving to a corresponding extent the strain on the funiform elements along the maximum pitch sections.

In the third embodiment, illustrated in FIGURES 7, 8 and 9, there is provided a chain-like structure in which the coupling between the ends of the transverse strands of the links and the main pulleys of adjacent links is formed by auxiliary funiform elements, instead of rigid connecting arms.

Thus, in the case of link B visible in FIGURES 7 and 8, may be seen a funiform element 41B which is double and which is divided by a pair of main pulleys 42B into a double longitudinal strand 43B and into a double transverse strand 44B. The end of the double longitudinal strand 43B is fastened by a shackle 45B to the pin 48C of the pair of main pulleys 42C belonging to the following link C, while the end of the double transverse strand 44B is fastened by a pair of shackles 47B to a pin 49B which carries a main pulley 52B around which passes an auxiliary funiform element 51B which is divided by this pulley into an auxiliary longitudinal strand 53B and an auxiliary transverse strand 54B. The auxiliary longitudinal strand 53B is fastened by a shackle 46B to the pin 49C which corresponds, in link C, to the pin 49B of link B. The end of the auxiliary transverse strand 54B is fastened by a shackle 58B to the pin 48B of the pair of main pulleys 42B. It will be observed that the auxiliary funiform element 51B fulfills, together with the secondary pulley 52B, a function similar to that fulfilled by the pair of arms 6B in the first embodiment. This element indirectly connects the end of the transverse strand 44B (which is double) of the funiform element 41B of the link B, with the pair of main pulleys 42C of the following link C. This connection is indirect because it resorts to the transverse strand 44C of the funiform element of this following link, in contradistinction to the direct connection provided in the first embodiment by the pair of arms 6. The pin 48C of the pair of main pulleys 42B carries a first pair of rollers 50B and the pin 49B of the secondary pulley 52B carries a second pair of rollers 60B. The pairs of pulleys 50B and 60B respectively cooperate with the upper faces 56 and lower faces 57 of a guide means 55 consisting of a pair of rails maintained in parallel relationship with one another by dropped cross-members such as cross-member 58. This guide means is of varying thickness as in the other embodiment. It may be of advantage to compel the pins of the main and secondary pulleys, e.g. the pins 48C and 49C of the main and secondary pulleys 42C and 52C of link C, to remain perpendicular to the guide means 55 and to compel the transverse strands 44C and 54C of link C to remain substantially perpendicular to the direction of movement of the structure (indicated by arrow 20). To this end the pins are connected two by two by means of hinged levers of equal length, such as the levers 29, and their pivot 39 is made to follow a groove 59 running at mid-thickness along the guide means 55.

When the chain-like structure formed by the assembly of links that have just been described progresses along the guide means, the length of the transverse strands varies and the length of the longitudinal strands varies accordingly; this assembly thus constitutes a varying-pitch chain-like structure.

Three embodiments of the arrangement provided by the present invention have been described above. Clearly, these embodiments may be modified in various ways, in particular by adopting links that are symmetrical, in relation to the means lines LL', to those shown in FIGURES 1, 5 and 7. FIGURE 10 shows, in the form of a recapitulative table, the main variants. This table is in itself sufficiently explicit (the reference numerals there have the same significance as in the foregoing descriptions) for it to be unnecessary to give much explanation. It may be pointed out by way of reminder that link $a$ corresponds to that of the first embodiment, the link $b$ corresponds to that of the second and that link $e$ corresponds to that of the third. Links $c$ and $d$ are derived by symmetry from links $a$ and $b$ respectively in relation to the means LL'. The same applies to links $e$ and $g$ and to links $f$ and $h$. Link $f$ results from the replacement, in link $b$ which has been described in relation to the second embodiment, of the rigid arms 26 by an auxilary funiform element 53, 54, in the manner of what has been described in relation to the third embodiment. For greater clarity, these auxiliary funiform elements have been shown in double lines and the varying spacing of the paths followed by the pins of the first second rollers, to which are fastened the ends of the transverse strands respectively, have been represented by $\epsilon$.

A variant, which is related to the third embodiment, is shown in FIGURES 11 and 12. It consists in forming with the transvers strand of each funiform element several transverse sub-strands by causing the strand over idle pulleys so that these substrands form a tackle.

In FIGURES 11 and 12, there is an upper funiform element 61B which is double and a lower auxiliary funiform element 66B which is single, as in FIGURES 8 and 9. The transverse strand of the upper funiform element 61B (FIGURE 11) passes round a double idle pulley 62B and its end is fastened by a shackle 63B on a pin 64B carrying a double main upper pulley 65B (FIGURE 12). Symmetrically, the transverse strand of the lower auxiliary funiform element 66B passes over an idle pulley 67B mounted on the pin 64B of the upper main double pulley 65B and its end is fastened by a shackle 68B to a pin 69B carrying a secondary lower pulley 70B and the double idle pulley 62B. The pins 64B and 69B, each carry, as before, a first pair of rollers 71B and a second pair of rollers 72B respectively which cooperate with the upper surfaces 156 and the lower surfaces 157 of a guide means 155 consisting of two parallel rails of varying thickness.

In this variant, the funiform element 61B therefore comprises a single transverse strand divided into two sub-strands 73B and 74B; the latter constitute together with the idle pulley 62B a tackle whose pin 69B connected, through the intermediary of the coupling means formed by the auxiliary funiform element 66B, to the corresponding pin of the following link. The transverse strand of this auxiliary funiform element 66B is also made up of two sub-strands 75B and 76B which, together with the idle pulley 67B, form a second tackle.

The use of funiform element having several tackled transverse sub-strands have the advantage of reducing the variation in the guide means thickness that is required to achieve a given variation in length of the longitudinal strands; for a given transverse size of the chain-like arrangement, a variant with tackled transverse sub-strands enables a greater variation in pitch to be achieved.

FIGURES 11 and 12 relate to the case when the tackles each comprises two sub-strand and only one idle pulley. Obviously these tackles can comprise more than two sub-strands and several idle pulleys: the greater the multiplicity of the tackles, the greater is the ratio achieved between the maximum pitch and minimum pitch of the chain-like structure; but the greater also will be the stresses that will have to be borne by the faces of the guide means and by the rollers.

The varying-pitch chain-like arrangement provided by the invention, and of which three embodiments have just been described, lends itself particularly well to driving loads required to travel at varying speed along a closed circuit. To achieve this it suffices to form with the links a closed-loop chain-like structure, to arrange the guide means in such manner that the path of the main pulleys lies parallel to the circuit along which travel the loads to be driven, and to connect the latter to the pins of the main pulleys. This is what is shown in FIGURE 13 in which are to be seen the guide means 81 of a chain-like structure consisting of links 83 belonging to the first embodiment; these links are assembled into a closed loop which is so disposed that the main pulleys 84 follow a path which is parallel to a path 85 along which travel loads 86. The guide means 81, in zone RMN, has a minimum thickness $\epsilon_{min}$, and, in zone OPQ has a maximum thickness $\epsilon_{max}$; in zone NO, its thickness increases progressively from $\epsilon_{min}$ to $\epsilon_{max}$ and in zone QR this thickness progresively decreases from $\epsilon_{max}$ to $\epsilon_{min}$. A power unit 82, of any suitable type, drives the chain-like structure along the guide means in the direction of the arrow 80. The loads 86 are hooked by means of hooks 87 (shown in chain lines in FIGURES 3, 9 and 12) on to the pins of the main pulleys. It will be observed that, with the chain-like structure driven at constant speed, the variation of its pitch, between the maximum $p_{max}$ (in zone RMN) and the minimum value $p_{min}$ (in zone OPQ) causes a variation of the speed at which the driven loads are moved, the law governing this variation being determined by that which governs the thickness of the guide means 81.

By way of loads that such a system is capable of driving, reference may be made to the transport units of the systems described in British Patents Nos. 1,034,969, 1,035,704 and 1,075,818, in Swiss patent application No. 6,625/67, and in Japanese patent application No. 70,801/66. The guide means of the chain-like system must then be so arranged that a portion at least of the path travelled over by the main pulleys describes a curve which is parallel to at least a portion of the path to be travelled over by these transport units.

I claim:

1. A varying-pitch chain-like arrangement, which comprises guide means including a first surface and a second surface, said first and second surfaces having a spacing which varies along at least a portion of said guide means, and a plurality of successive links, each of said links comprising a first roller carried by a first pin and cooperating with said first surface, a second roller carried by a second pin and cooperating with said second surface, a main pulley mounted on said first pin, a funiform element passing round said main pulley and divided by said main pulley into a longitudinal strand and into a transverse strand, the end of said longitudinal strand being fastened to the first pin of a first adjacent link and said transverse strand being connected to said second pin, and coupling means for coupling said second pin to one of the pins of one of the adjacent links.

2. An arrangement according to claim 1, wherein said coupling means include a rigid member having one end fastened to said second pin.

3. An arrangement according to claim 2, wherein the other end of said rigid member is fastened to the first pin of said first adjacent link.

4. An arrangement according to claim 2, wherein the other end of said rigid member is fastened to the first pin of the other adjacent link.

5. An arrangement according to claim 1, wherein said each link further comprises a secondary pulley mounted on said second pin and said coupling means include an auxiliary funiform element passing round said secondary pulley and divided by said secondary pulley into a longitudinal strand and a transverse strand, the end of said longitudinal strand being fastened to the second pin of an adjacent link and said transverse strand being connected to said first pin.

6. An arrangement according to claim 5, wherein the end of the longitudinal strand of said auxiliary funiform element is fastened to the second pin of said first adjacent link.

7. An arrangement according to claim 5, wherein the end of the longitudinal strand of said auxiliary funiform element is fastened to the second pin of the other adjacent link.

8. An arrangement according to claim 1, wherein said each link further comprises an idle pulley mounted on said second pin and said transverse strand passes round said idle pulley, the end of said transverse strand being fastened to said first pin and said transverse strand forming, together with said idle pulley, a tackle.

9. An arrangement according to claim 5, wherein said each link further comprises a first idle pulley mounted on said second pin and a second idle pulley mounted on said first pin, wherein the transverse strand of the first mentioned funiform element passes round said first idle pulley, the end thereof being fastened to said first pin, and wherein the transverse strand of said auxiliary funiform element passes round said second idle pulley, the end thereof being fastened to said second pin, each of said transverse strands forming, together with the idle pulley associated therewith, a tackle.

10. An arrangement according to claim 1, for driving loads at varying speed, wherein said guide means form a closed loop and said plurality of links form an uninterrupted loop, and wherein means are provided for hooking said loads on to said first pins.

References Cited
UNITED STATES PATENTS 2,534,054   12/1950   Parkes _____ 198—129

EDWARD A. SROKA, Primary Examiner